(12) United States Patent
Van Hardeveld et al.

(10) Patent No.: US 9,005,538 B2
(45) Date of Patent: Apr. 14, 2015

(54) STACKED CATALYST BED FOR FISCHER-TROPSCH

(75) Inventors: Robert Martijn Van Hardeveld, Amsterdam (NL); Thomas Joris Remans, Amsterdam (NL); Erwin Roderick Stobbe, Amsterdam (NL)

(73) Assignee: Shell Oil Company, Houston, TX (US)

( * ) Notice: Subject to any disclaimer, the term of this patent is extended or adjusted under 35 U.S.C. 154(b) by 408 days.

(21) Appl. No.: 13/535,040

(22) Filed: Jun. 27, 2012

(65) Prior Publication Data

US 2013/0023594 A1 Jan. 24, 2013

(30) Foreign Application Priority Data

Jun. 28, 2011 (EP) .................................... 11171682

(51) Int. Cl.
| | | |
|---|---|---|
| *B01J 8/06* | (2006.01) | |
| *B01J 8/04* | (2006.01) | |
| *C10G 2/00* | (2006.01) | |
| *B01J 35/02* | (2006.01) | |
| *B01J 8/02* | (2006.01) | |
| *B01J 35/00* | (2006.01) | |
| *B01J 23/75* | (2006.01) | |

(52) U.S. Cl.
CPC ... *C10G 2/00* (2013.01); *B01J 8/06* (2013.01); *B01J 35/026* (2013.01); *B01J 8/067* (2013.01); *B01J 8/025* (2013.01); *B01J 2208/00672* (2013.01); *B01J 2208/025* (2013.01); *B01J 2219/00038* (2013.01); *B01J 2219/0004* (2013.01); *B01J 35/0006* (2013.01); *B01J 23/75* (2013.01)

(58) Field of Classification Search
None
See application file for complete search history.

(56) References Cited

U.S. PATENT DOCUMENTS

| | | | |
|---|---|---|---|
| 3,857,780 A | 12/1974 | Gustafson | 208/139 |
| 3,966,644 A | 6/1976 | Gustafson | 252/455 R |
| 4,595,703 A | 6/1986 | Payne et al. | 518/715 |
| 6,262,131 B1 * | 7/2001 | Arcuri et al. | 518/700 |
| 2004/0048938 A1 * | 3/2004 | Mohedas et al. | 518/726 |
| 2004/0076562 A1 * | 4/2004 | Manzanec et al. | 422/211 |
| 2004/0192989 A1 * | 9/2004 | Espinoza et al. | 585/638 |
| 2009/0134062 A1 | 5/2009 | Pieterse et al. | 208/84 |
| 2009/0270518 A1 | 10/2009 | Bezember et al. | 518/714 |
| 2011/0160318 A1 * | 6/2011 | Bos et al. | 518/715 |
| 2013/0165537 A1 * | 6/2013 | Van Hardeveld et al. | 518/715 |

FOREIGN PATENT DOCUMENTS

| | | | |
|---|---|---|---|
| WO | WO9700231 | 1/1997 | C07C 1/00 |
| WO | WO03013725 | 2/2003 | B01J 35/02 |
| WO | WO03103833 | 12/2003 | B01J 35/02 |
| WO | WO2004041430 | 5/2004 | B01J 35/02 |
| WO | WO2008087149 | 7/2008 | C10G 2/00 |
| WO | WO2008089376 | 7/2008 | |
| WO | WO2010063850 | 6/2010 | C10G 2/00 |
| WO | WO2010069925 | 6/2010 | C10G 2/00 |
| WO | WO2010069927 | 6/2010 | C10G 2/00 |
| WO | WO2011080197 | 7/2011 | C10G 2/00 |

* cited by examiner

*Primary Examiner* — Jennifer A Leung

(57) ABSTRACT

The invention pertains to a reactor tube comprising a fixed bed of Fischer-Tropsch catalyst particles, wherein the catalyst particles in 5%-40% of the fixed bed volume at the upstream end have an average outer surface to volume ratio (S/V) of between 3.0 to 4.5 mm-1, and the remaining catalyst particles have an average S/V of between 4.5 to 8.0 mm-1, and wherein the difference between the average S/V of the particles at the upstream end and the remaining fixed bed volume is at least 0.5 mm-1. Additionally the fixed bed volume at the upstream end shows a full-bed apparent catalytic activity per volume unit lower than the full-bed apparent catalytic activity per volume unit in the remaining fixed bed volume and/or the weight of catalytically active metal per weight unit at the upstream end is more than 70% lower than in the remaining fixed bed volume.

8 Claims, No Drawings

STACKED CATALYST BED FOR FISCHER-TROPSCH

This patent application claims the benefit of European Patent Application 11171682.5 filed Jun. 28, 2011, which is incorporated herein by reference.

BACKGROUND

The present invention relates to a fixed catalyst bed suitable to be used in a Fischer-Tropsch process, in particular to a fixed bed which is able to withstand a process for carrying out a high-speed stop in a Fischer-Tropsch process. The present invention further relates to the use of the fixed bed, and to a Fischer-Tropsch process in which the fixed bed is used.

The Fischer-Tropsch process can be used for the conversion of hydrocarbonaceous feed-stocks into normally liquid and/or solid hydrocarbons (0° C., 1 bar). The feed stock (e.g. natural gas, associated gas, coal-bed methane, residual oil fractions, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight hydrocarbons comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebullated bed reactors. WO2008089376 discloses a Fischer-Tropsch microchannel reactor comprising a plurality of Fischer-Tropsch process microchannels and a plurality of heat exchange channels. A microchannel is defined in WO2008089376 as a channel having at least one internal dimension of height or width of up to about 10 mm. The Fischer-Tropsch catalyst in the microchannels may be a graded catalyst. The graded catalyst may have a varying concentration or surface area of a catalytically active metal. The graded catalyst may have physical properties and/or a form that varies as a function of distance.

The Fischer-Tropsch reaction is very exothermic and temperature sensitive. In consequence, careful temperature control is required to maintain optimum operation conditions and desired hydrocarbon product selectivity.

The fact that the reaction is very exothermic also has the consequence that when temperature control is not adequate, the reactor temperature can increase very quickly, which carries the risk of a reactor runaway. A reactor runaway may result in highly increased temperatures at one or more locations in the reactor. A reactor runaway is a most undesirable phenomenon, as it may result in catalyst deactivation which necessitates untimely replacement of the catalyst, causing reactor downtime and additional catalyst cost.

A high-speed stop may, for example, be required when the temperature in the Fischer-Tropsch reactor increases to an unacceptable value either locally or over the entire reactor, when there is an interruption in the gas flow, or in the case of other unforeseen circumstances. When there is a threat of a runaway, it is often wise to stop the reaction as quick as possible. Several processes for carrying out a high-speed stop in a Fischer-Tropsch reactor have been developed.

The desired use of highly active and less diffusion limited catalysts in Fischer-Tropsch fixed-bed reactors makes the situation even more challenging. The susceptibility to a runaway increases with increased catalyst activity and with reduced diffusion limitation of the catalyst. Examples of methods that are especially suitable for Fischer-Tropsch fixed-bed reactors comprising highly active and less diffusion limited catalysts can be found in WO2010063850, WO2010069925, and WO2010069927.

When a high-speed stop is carried out in a fixed-bed reactor, a raise in temperature, culminating in a process-side temperature peak is often observed. If a process-side temperature peak is observed, it is usually observed at the upstream side of the catalyst bed.

A process-side temperature peak is generally caused by a decrease in gas space velocity which leads to an increased conversion, accompanied by increased heat formation, and simultaneously to a decrease in heat removal capacity.

The peak temperature increase can be minimized by choosing the right method for the high-speed stop, but it will nevertheless have some influence on the catalyst bed. Especially when less diffusion limited catalysts in Fischer-Tropsch fixed-bed reactors are applied, the conditions during a high-speed stop are critical.

Therefore, there is need for a Fischer-Tropsch fixed-bed which is better able to withstand any kind of process for carrying out a high-speed stop in a Fischer-Tropsch process.

SUMMARY OF THE INVENTION

The present invention concerns a reactor tube comprising a fixed bed of Fischer-Tropsch catalyst particles, wherein catalyst particles in a relatively thin layer at the upstream end have a normal diffusion limitation, and catalyst particles in the remaining fixed bed volume have a decreased diffusion limitation. The reactor tube of the present invention proofed to be better capable of withstanding a process for carrying out a high-speed stop in a Fischer-Tropsch process than a reactor tube only filled with catalyst particles having the advantageous decreased diffusion limitation. With the current invention, diffusion limitation during normal operation is kept to a minimum while at the same time the risk of a reactor runaway during a high-speed stop is minimized.

Examples of suitable catalysts having a normal diffusion limitation are trilobe catalysts with a 'cloverleaf' cross section, such as the trilobes described in U.S. Pat. No. 3,857,780 and U.S. Pat. No. 3,966,644. In the current invention, the catalysts with a normal diffusion limitation preferably have an average outer surface to volume ratio (S/V) in the range of between 3.0 to 4.5 $mm^{-1}$.

Examples of suitable catalysts having a decreased diffusion limitation can be found in WO2010063850, WO2010069925, and WO2010069927. Catalyst particles having a decreased diffusion limitation have a relatively high outer surface to volume ratio. In the current invention, the catalysts with a decreased diffusion limitation preferably have an outer surface to volume ratio (S/V) larger than 4.5 $mm^{-1}$ and smaller than 8.0 $mm^{-1}$.

The extent of the difference in diffusion limitation between catalysts having a normal diffusion limitation and catalysts having a decreased diffusion limitation can be determined in a standard test at the same syngas conversion rate.

A reactor tube comprising a Fischer-Tropsch fixed-bed which is highly suitable to withstand any kind of process for carrying out a high-speed stop in a Fischer-Tropsch process has been described in WO2011080197. It concerns a fixed-bed in which catalyst particles at the upstream end of the fixed-bed have a normal diffusion limitation, while catalyst particles in the remaining part of the fixed-bed are less diffusion limited.

As a Fischer-Tropsch fixed bed according to WO2011080197 is very well capable of withstanding a high-speed stop in a Fischer-Tropsch reactor, it gives freedom in choosing a method for the high-speed stop, even when highly active and less diffusion limited catalysts are present. It also gives the possibility to prepare a catalyst bed with a higher activity and/or a higher selectivity towards $C_5$+ hydrocarbons during the Fischer-Tropsch process as compared to a fixed-bed which only comprises catalyst particles with a normal diffusion limitation. When using a Fischer-Tropsch fixed bed according to WO2011080197 a better temperature profile over the catalyst bed in the reactor tube can be obtained during the Fischer-Tropsch process as compared to a fixed-bed which only comprises catalyst particles with a normal diffusion limitation.

In one specific embodiment described in WO2011080197, 5% to 40% of the fixed bed volume at the upstream end shows a full-bed apparent catalytic activity per volume unit which is 30% to 70% lower than the full-bed apparent catalytic activity per volume unit in the remaining fixed bed volume. This specific combination of catalyst shapes and catalytic activity proofed to be very advantageous.

Surprisingly, it has now been found that another specific combination of catalyst shapes and catalytic activity is highly advantageous and shows unexpected advantages.

The present invention concerns a reactor tube comprising a fixed bed of Fischer-Tropsch catalyst particles, wherein the catalyst particles in 5% to 33% of the fixed bed volume at the upstream end, preferably in 7% to 25%, more preferably 7 to 18% of the fixed bed volume at the upstream end, have an average outer surface to volume ratio (S/V) in the range of between 3.0 to 4.5 mm$^{-1}$, preferably in the range of between 3.3 to 4.0 mm$^{-1}$, and the catalyst particles in the remaining fixed bed volume have an average outer surface to volume ratio (S/V) in the range of between 4.5 to 8.0 mm$^{-1}$, preferably in the range of between 4.6 to 8.0 mm$^{-1}$, more preferably in the range of between 4.8 to 7.5 mm$^{-1}$. The difference between the average S/V of the particles at the upstream end and the average S/V of the particles in the remaining fixed bed volume is at least 0.5 mm$^{-1}$. Additionally, 5% to 33% of the fixed bed volume at the upstream end, preferably in 7% to 25%, more preferably 7 to 18% of the fixed bed volume at the upstream end, shows a full-bed apparent catalytic activity per volume unit which is more than 70% lower, preferably 71% to 85% lower, more preferably 71% to 80% lower than the full-bed apparent catalytic activity per volume unit in the remaining fixed bed volume. Additionally or alternatively, the weight of catalytically active metal per weight unit in 5% to 33% of the fixed bed volume at the upstream end, preferably in 7% to 25%, more preferably 7 to 18% of the fixed bed volume at the upstream end, is more than 70% lower, preferably 71% to 85% lower, more preferably 71% to 80% lower than the weight of catalytically active metal per weight unit in the remaining fixed bed volume.

DETAILED DESCRIPTION

During the Fischer-Tropsch reaction hydrogen and carbon monoxide react with each other. The syngas that is used for the Fischer-Tropsch reaction may comprise gaseous components besides hydrogen and carbon monoxide. Gaseous components that do not take part in the Fischer-Tropsch reaction are considered to be inert toward this reaction; they are also referred to as inerts. Examples of such inerts are nitrogen and carbon dioxide.

A Fischer-Tropsch fixed bed according to WO2011080197 is very well capable of withstanding a high-speed stop in a Fischer-Tropsch reactor. It can be used regardless the level of inert gasses in the syngas that is used for the Fischer-Tropsch reaction. The syngas used may, for example, comprise gaseous components that are inert towards a Fischer-Tropsch reaction in an amount of up to 80 volume %. The syngas used may, for example, comprise gaseous components that are inert towards a Fischer-Tropsch reaction in an amount in the range of between 10 and 80 volume %.

A Fischer-Tropsch fixed bed according to the present invention is especially suitable when the syngas that is used comprises gaseous components that are inert towards a Fischer-Tropsch reaction in an amount in the range of between 30 and 80 volume %, preferably between 35 and 80 volume %. At such relatively high amounts of inerts the fixed bed proofed to be very well capable of withstanding a high-speed stop in a Fischer-Tropsch reactor, and at the same time showed a high $C_5$+ selectivity during the Fischer-Tropsch reaction. It also showed a very low carbon dioxide formation during the Fischer-Tropsch reaction.

In a preferred embodiment of the present invention, the fixed bed volume at the upstream end showing a full-bed apparent catalytic activity per volume unit which is more than 70% lower, preferably 71% to 85% lower, more preferably 71% to 80% lower than the full-bed apparent catalytic activity per volume unit in the remaining fixed bed volume, comprises the catalyst particles having an average outer surface to volume ratio (S/V) in the range of between 3.0 to 4.5 mm$^{-1}$, preferably in the range of between 3.3 to 4.0 mm$^{-1}$.

In a preferred embodiment, the catalyst particles at the upstream end having an average outer surface to volume ratio (S/V) in the range of between 3.0 to 4.5 mm$^{-1}$, preferably in the range of between 3.3 to 4.0 mm$^{-1}$, have a weight of catalytically active metal per weight unit which is more than 70% lower, preferably 71% to 85% lower, more preferably 71% to 80% lower than the weight of catalytically active metal per weight unit in the remaining fixed bed volume.

Upstream and downstream are defined herein with respect to the flow of the syngas, i.e. the flow of the mixture of hydrogen and carbon monoxide, in a Fischer Tropsch reactor tube. Reference herein to the upstream end of the fixed bed of Fischer-Tropsch catalyst particles is thus to the end of the fixed bed to which the syngas is supplied during Fischer Tropsch reaction. Reference herein to the downstream end of the fixed bed of Fischer-Tropsch catalyst particles is to the other end.

The present invention concerns a reactor tube comprising a fixed bed of Fischer-Tropsch catalyst particles. A catalyst particle is defined for this specification as a particle that either is catalytically active, or that can be made catalytically active by subjecting it to hydrogen or a hydrogen containing gas.

For example, metallic cobalt is catalytically active in a Fischer-Tropsch reaction. In case the catalyst particle comprises a cobalt compound, the cobalt compound can be converted to metallic cobalt by subjecting it to hydrogen or a hydrogen containing gas. Subjection to hydrogen or a hydrogen containing gas is sometimes referred to as reduction or activation.

When a catalyst particle is referred to as comprising a certain weight of catalytically active metal, reference is made to the weight of metal atoms in the particle which are catalytically active when in metallic form. A catalyst particle comprising a cobalt compound, for example, is thus considered as a catalyst particle having a certain weight of catalytically active cobalt atoms. A catalyst particle thus comprises a certain weight of catalytically active metal, regardless of its oxidation state.

In a reactor tube according to the present invention, the average outer surface to volume ratio (S/V) of the catalyst particles varies along the length of the fixed bed. This results in a variation in diffusion limitation of the catalyst particles. Different reactants will typically travel through the catalyst at different rates. When the surface to volume ratio of the catalyst is maximized, the diffusion limitation is minimized.

The diffusion limitation of a Fischer Tropsch catalyst is the diffusional mass transport limitation of for example the syngas components within the catalyst, i.e. the decrease of CO and/or hydrogen partial pressure and/or the change of the hydrogen/carbon monoxide-ratio within the catalyst. The extent of the difference in diffusion limitation between catalysts having a normal diffusion limitation and catalysts having a decreased diffusion limitation can be determined in a standard test at the same syngas conversion rate.

Catalysts with a decreased diffusion limitation have a relatively high outer surface to volume ratio. When determining the outer surface of the particle, the surface area of the pores in the carrier material are ignored.

When the length, the diameter and the form, or shape of a catalyst, are known, the surface and volume can be determined using the appropriate calculations. Similarly, when the length, the perimeter and the cross section of a catalyst, are known, the surface and volume can be determined using the appropriate calculations. When making calculations, usual deviations from the ideal shape, for example due to chips that may fall off and variations in length of the particles, may be taken into account.

The average length of a catalyst may be determined by measuring the length of at least 10 catalyst particles, preferably at least 50 catalyst particles. The average cross section of a catalyst may be determined by cutting at least 10 catalyst particles, preferably at least 50 catalyst particles, transverse and measuring and the surface area. The average perimeter of a catalyst may, for example, be determined by cutting at least 10 catalyst particles, preferably at least 50 catalyst particles, transverse and measuring and the perimeter. This is especially suitable for extrudates. In case, for example, a microscope is used and the cut is about ten times magnified, the nanometer sized pores of the carrier material are not visible.

A fairly recent trend in the development of Fischer-Tropsch catalysts is the development of catalyst particles with a decreased diffusion limitation. It has been found that catalysts with a decreased diffusion limitation are highly active in Fischer-Tropsch processes. However, due to their high activity and their higher activation energy, their use entails an increased risk of reactor runaway. Further, it has also been found that catalysts with a decreased diffusion limitation are particularly sensitive to a high-speed stop. Therefore, the present invention is of particular interest for reactors comprising a catalyst with decreased diffusion limitation.

The present invention is even more of interest for reactors comprising a catalyst with a decreased diffusion limitation and an effective diameter, i.e. the diameter of a sphere with the same outer surface over inner volume ratio, or equivalent sphere diameter, of at most 2 mm, preferably of at most 1.6 mm, more preferably of at most 1.5 mm, even more preferably of at most 1.4 mm.

Catalysts with a decreased diffusion limitation are for example described in WO2003013725, WO2008087149, WO2003103833, and WO2004041430. Especially catalysts as described in WO2008087149, which are also referred to as "TA" shaped catalyst particles, are very suitable in the current invention.

Catalysts with a decreased diffusion limitation used in a reactor according to the present invention preferably have an outer surface to volume ratio (S/V) larger than $4.5\ mm^{-1}$, more preferably larger than $4.6\ mm^{-1}$, even more preferably larger than $4.8\ mm^{-1}$. Catalysts with a decreased diffusion limitation have an outer surface to volume ratio (S/V) preferably smaller than $8.0\ mm^{-1}$, more preferably smaller than $7.5\ mm^{-1}$. When determining the S/V ratio, the error made normally is about $0.1\ mm^{-1}$.

It was now found that a specific combination of catalysts with a decreased diffusion limitation and catalysts with a normal diffusion limitation makes it possible to further reduce the problems faced when working with catalysts with a decreased diffusion limitation.

Catalysts with a normal diffusion limitation are, for example, trilobe catalysts with a 'cloverleaf' cross section. Examples of such trilobes have been described in, for example, U.S. Pat. No. 3,857,780 and U.S. Pat. No. 3,966,644. Trilobe catalysts with a 'cloverleaf' cross section are sometimes referred to as "TL" shaped catalysts. A trilobe catalyst with a 'cloverleaf' cross section shows a good mechanical strength but also shows significant mass transfer limitations. Especially for Fisher Tropsch reactions and hydrocracking reactions the mass transfer limitations of such trilobe catalysts are significant.

Catalysts with a normal diffusion limitation used in a reactor according to the present invention preferably have an average outer surface to volume ratio (S/V) in the range of between 3.0 to $4.5\ mm^{-1}$, preferably in the range of between 3.3 to $4.0\ mm^{-1}$.

One advantage of the present invention is that an increased selectivity towards $C_5+$ hydrocarbons is observed as compared to a reactor tube with a uniform fixed bed of catalysts with a normal diffusion limitation.

Another advantage of the present invention is that over the life time of the fixed bed of catalyst particles the fixed bed remains very well capable of withstanding a process for carrying out a high-speed stop in a Fischer-Tropsch process. Without wishing to be bound to any theory, it seems that in the present invention any difference in deactivation rate of the different particles at different locations in the bed during use in a Fischer-Tropsch process hardly has an influence on the ability to withstand a high-speed stop.

When a Fischer-Tropsch process is performed and the reactor is at reaction temperature and pressure and effluent is being withdrawn from the reactor, and this process is suddenly brought to an end by a high-speed stop, a local rise in temperature, culminating in a local process-side temperature peak, is often observed. Such a local process-side temperature peak is usually observed at the upstream side of the catalyst bed. This is generally caused by a decrease in gas space velocity which leads to an increased conversion, accompanied by increased heat formation, and simultaneously to a decrease in heat removal capacity.

It has now been found that the catalyst bed in a reactor tube according to the present invention shows an increase in peak temperature during a high-speed stop according to a certain method which is lower than the increase in peak temperature which is obtained when the same high-speed stop method is applied to a fixed bed in a reactor tube whereby both the catalysts in the upstream end of the fixed bed and the catalysts in the remaining fixed bed volume have a decreased diffusion limitation.

The fact that the catalyst bed in a reactor tube according to the present invention is very well capable to withstand a high-speed stop in a Fischer-Tropsch process gives more freedom in choosing a method for the high-speed stop, even when highly active and less diffusion limited catalysts are present. For example, apart from the methods described in WO2010063850, WO2010069925, and WO2010069927, for some embodiments it is possible to apply a more robust but also simpler high-speed stop by blocking the flow of feed to the reactor and depressurising the reactor via the bottom.

Another advantage is that with a catalyst bed in a reactor tube according to the present invention it is possible to prepare a catalyst bed with a lower selectivity towards carbon dioxide during the Fischer-Tropsch process as compared to a fixed-bed which only comprises catalyst particles with a normal diffusion limitation.

Another advantage is that it is possible to prepare a catalyst bed that forms less methane during the Fischer-Tropsch process as compared to a fixed-bed which only comprises catalyst particles with a normal diffusion limitation.

In a reactor tube according to the present invention, the so-called "full-bed apparent catalytic activity" of the catalyst particles varies along the length of the fixed bed. The full-bed apparent catalytic activity of the catalyst particles in the upstream end of the fixed bed is lower than the full-bed apparent catalytic activity of the catalyst particles in the downstream end.

The full-bed apparent catalytic activity of catalyst particles is for the current specification defined as the activity of such catalyst particles as measured under standard test conditions. This can be compared with the full-bed apparent catalytic activity of other catalyst particles which have been measured under the same standard test conditions. The full-bed apparent catalytic activity of a part of a stacked fixed bed is the activity of a part of a stacked fixed bed as measured under standard test conditions. This can be compared with the full-bed apparent catalytic activity of one or more other parts of the fixed bed which has/have been measured under the same standard test conditions.

Process conditions that are generally monitored during standard test conditions are, for example, temperature, pressure, reactants composition, conversion level, flow rate of reactants, catalyst volume and catalyst bed height.

The full-bed apparent catalytic activity may differ from the local activity measured during a reaction process, as the local reaction conditions may differ along the length of the reactor tube.

Standard test conditions to determine the full-bed apparent catalytic activity are preferably chosen in the following way.

A reactor tube is filled with a fixed bed of catalyst particles of which the full-bed apparent catalytic activity is to be determined. During Fischer-Tropsch reaction conditions the pressure preferably is kept within 35-70 bar. The temperature preferably is kept within 180-240° C. The feed ratio of $H_2$ and CO preferably is kept within 1.00-2.00, more preferably within 1.05-1.4. The feed of inert gas preferably is kept within 0-80 vol %, more preferably within 4-65 vol % of the total feed. The outlet ratio of $H_2$ and CO preferably is kept within 0.5-1.0, more preferably within 0.6-0.8.

The comparison of the performance of different fixed beds of catalyst particles is preferably performed within a narrow window of equal process conditions.

Preferably the difference in feed ratio of $H_2$ and CO is within 0.04. Preferably the difference in outlet ratio of $H_2$ and CO is within 0.04. Preferably the difference in total pressure over the fixed bed is within 2 bar. Preferably the difference in feed temperature is within 1° C.

The catalyst beds to be compared preferably have been subjected to a similar catalyst pretreatment, such as reduction, and a similar start-up history. The catalyst beds preferably have a difference in equal time-on-stream hours within 10 hours. When determining the volumetric activity, the actual loaded weight of the catalyst in the reactor tube and the actual bed density in the reactor tube are preferably taken into account. The size of the catalyst beds preferably is of the same order of magnitude.

The performance of catalysts beds of any size can be tested. Useful results can already be obtained when comparing fixed beds having a weight of only about 0.1 gram. Other examples are beds of about 10 gram, beds of hundreds of grams, and of tens of kilos. The length of the fixed beds can be a few millimeters, several centimeters, 10 or more meter, and up to tens of meters. The diameter or width of the fixed bed can be only a millimeter, between 2-15 millimeter, several centimeters, and larger. The difference in length of the catalyst bed preferably is within 5%, more preferably within 1%, of the longest bed. The difference in diameter or width of the catalyst bed preferably is within 5%, more preferably within 1%, of the largest diameter or width.

The spread in temperature over each catalyst bed preferably is controlled. This can be achieved by putting a reactor tube with a fixed bed in an isothermal zone of a reactor. Preferably the difference in temperature over a catalyst bed is within 1° C. when an inert gas is flowing through the bed, and within 5° C. during Fischer-Tropsch reaction conditions.

A reactor tube according to the present invention preferably comprises a fixed bed of Fischer-Tropsch catalyst particles in which all catalyst particles comprise the same metal as catalytically active metal. It is however also possible to have a different type of catalytically active metal in the catalyst particles at the upstream end of the fixed bed as compared to the catalyst particles in the rest of the fixed bed.

In a preferred embodiment of the present invention, the surface area of catalytically active metal in the upstream end of the fixed bed is lower than in the downstream end.

In a further preferred embodiment of the present invention, the dispersion of catalytically active metal in the upstream end of the fixed bed is lower than in the downstream end.

A reactor tube comprising a fixed bed of Fischer-Tropsch catalyst particles may be filled partly with the catalyst bed, and the other part may be empty. For example, some empty space may be present in the reactor tube above and below the catalyst bed.

The "fixed bed volume" of a fixed bed in a reactor tube is defined as the inner volume of that part of the reactor tube where the fixed bed of catalyst particles is present. This volume thus includes the volume taken by the catalyst particles. For example, when a cylindrical reactor tube with a height (or length) of 12 meters and an inner diameter of 2 cm contains a fixed bed of catalyst particles over a length of 11 meters, the fixed bed volume is the inner volume of the reactor tube along these 11 meters, which—in ml—is:

$$\text{height}*\pi*(\text{radius})^2 = 1100 \text{ cm}*\pi*(1 \text{ cm})^2.$$

As mentioned above, a reactor tube may be partially filled with a fixed bed of catalyst particles. Preferably the reactor tube contains a fixed bed of catalyst particles over at least 85% of the length of the reactor tube, more preferably over at least 90%. Preferably the reactor tube contains a fixed bed of catalyst particles over at most 97% of the length of the reactor tube, more preferably over at most 95%. The total fixed bed volume thus preferably is at least 85%, more preferably at least 90% of the total inner volume of a reactor tube. The total fixed bed volume preferably is at most 97%, more preferably at most 95% of the total inner volume of a reactor tube.

According to one aspect of the present invention, the fixed bed comprises Fischer-Tropsch catalyst particles having a size of at least 1 mm. Particles having a size of at least 1 mm are defined as particles having a longest internal straight length of at least 1 mm. Preferably at least 50 wt %, more preferably at least 75 wt %, even more preferably at least 90 wt % of the particles in the fixed bed have a size of at least 1 mm.

The shape of catalyst particles used in the present invention may be regular or irregular. The dimensions are suitably 0.1-30 mm in all three directions, preferably 0.1-20 mm in all three directions, more in particular 0.1-6 mm. The particles may comprise a carrier material and a catalytically active metal. The particles may additionally comprise a support, for example a metal support. Suitable catalyst particles comprising a metal support are, for example, described in US20090270518. Suitable shapes are spheres, pellets, rings and, in particular, extrudates. Suitable ring shapes are, for example, described in US20090134062.

Catalysts with a decreased diffusion limitation as described in WO2008087149, which are also referred to as "TA" shaped catalyst particles, are very suitable in the current invention.

A "TA" shaped catalyst particle is formed as an elongated shaped particle having a cross section comprising three protrusions each extending from and attached to a central position, wherein the central position is aligned along the longitudinal axis of the particle, the cross-section of the particle occupying the space encompassed by the outer edges of six outer circles around a central circle, each of the six outer circles contacting two neighboring outer circles, the particle occupying three alternating outer circles equidistant to the central circle and the six interstitial regions, the particle not occupying the three remaining outer circles which are between the alternating occupied outer circles; wherein the ratio of the diameter of the central circle to the diameter of the outer occupied circle is more than 1 and the ratio of the diameter of the outer unoccupied circle to the diameter of the outer occupied circle is more than 1; and wherein the ratio of the diameter of the outer unoccupied circle to the diameter of the outer occupied circle is more than the ratio of the diameter of the central circle to the diameter of the outer occupied circle.

The ratio of the diameter of the central circle to the diameter of the outer occupied circle will be referred to as the 'inner ratio'. The ratio of the diameter of the outer unoccupied circle to the diameter of the outer occupied circle will be described as the 'outer ratio'. Hence, for a "TA" shaped particle the outer ratio is greater than the inner ratio.

The inner ratio preferably is more than 1.2, more preferably more than 1.35, even more preferably more than 1.4. The inner ratio can be up to 2.5 preferably up to 2. A particularly preferred value for the inner ratio is 1.5.

The outer ratio is preferably more than 1.3, more preferably more than 1.5. The maximum of the outer ratio is 2.0. A particularly preferred value for the outer ratio is 2.0.

Preferably the diameters of the three outer occupied circles differ less than 5% from each other, more preferably less than 2%. Most preferably the diameters of the three outer occupied circles are the same.

Preferably the nominal diameter of the extrudates is 0.5-6 mm, preferably 1-3 mm. The nominal diameter is the length from the furthest point on one outer occupied circle through the central circle centre and extending to a line drawn between the bottom of each of the remaining outer filled circles.

After a typical process of preparation of "TA" shaped catalyst particles, between 10% and 100% of the number of particles produced preferably have a nominal diameter with a deviation of less than 5% of the shape as defined above. Preferably, at least 50% of the catalyst particles have a nominal diameter with a deviation of less than 5% of the shape as defined above.

Suitably the distance between the three alternating circles and the central circle is the same. This distance is preferably less than half the diameter of the central circle, more preferably less than a quarter of the diameter of the central circle, with most preference given to particles having a cross-section in which the three alternating circles are attached to the central circle. Preferably the three alternating circles do not overlap with the central circle. Preferably therefore each outer circle tangentially contacts the central circle. In case of any overlap, the overlap of each alternating circle and the central circle will be less than 5% of the area of the central circle, preferably less than 2%, more preferably less than 1%.

Preferably said contact between each outer circle and two neighboring circles is tangential.

In the case where "TA shaped" catalyst particles are prepared by an extrusion process, die-plates are used and it is known to those skilled in the art to manufacture die-plates having one or more holes in the shape of the desired particles and which tolerances can be expected in practice when producing such die-plates. In this respect it is observed that the pressure release immediately after extrusion may result in deformation of the extrudates. Usually the minor deviations are within 10%, preferably within 5%, more preferably within 2% with respect to the ideal shape as defined above.

"TA" shaped catalyst particles may have a length/diameter ratio (L/D) of at least 1. The particles can have an L/D in the range between 1 and 10. Preferably, the particles have an L/D in the range between 2 and 6, especially around 3.

The shapes of catalyst particles used in the present invention are preferably obtained using an extrusion process.

Extrudates suitably have a length between 0.5 and 30 mm, preferably between 1 and 6 mm. Extrudates may be cylindrical, polylobal, or have any other shape. Their effective diameter, i.e. the diameter of a sphere with the same outer surface over inner volume ratio, is suitably in the range of 0.1 to 10 mm, more in particular in the range of 0.2-6 mm.

Catalysts used in a Fischer-Tropsch reaction often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO9700231A and U.S. Pat. No. 4,595,703.

References to "Groups" and the Periodic Table as used herein relate to the new IUPAC version of the Periodic Table of Elements such as that described in the 87th Edition of the Handbook of Chemistry and Physics (CRC Press).

In a preferred embodiment, the full-bed apparent catalytic activity in the upstream end of the fixed bed is lower than in the downstream end.

In one embodiment, the concentration of catalytically active metal in the upstream end of the fixed bed is lower than in the downstream end. This may be achieved by filling the reactor tube at the upstream end with less catalyst particles than at the downstream end.

Fewer particles at the upstream end may be achieved in different ways. For example, the upstream end of the catalyst bed may comprise both catalyst particles and inert particles. Additionally or alternatively, the catalyst particles at the upstream end may be loaded into the reactor tube at a higher speed than the catalyst particles at the downstream end.

A lower concentration of catalytically active metal in the upstream end of the fixed bed than in the downstream end may additionally or alternatively be achieved by filling the reactor tube at the upstream end with catalyst particles having a lower concentration of catalytically active metal than the catalyst particles at the downstream end.

A lower full-bed apparent catalytic activity in the upstream end of the fixed bed may additionally or alternatively be achieved by filling the reactor tube at the upstream end with catalyst particles that have a lower dispersion of catalytically active metal than the catalyst particles at the downstream end.

In a preferred embodiment, the weight of catalytically active metal per weight unit of the fixed bed volume in the upstream end of the fixed bed is lower than in the downstream end. This may, for example, be achieved by filling the reactor tube at the upstream end with catalyst particles having a lower concentration of catalytically active metal than the catalyst particles at the downstream end.

In a highly preferred embodiment the full-bed apparent catalytic activity in the upstream end of the fixed bed is lower than in the downstream end and the weight of catalytically active metal per weight unit of the fixed bed volume in the upstream end of the fixed bed is lower than in the downstream end.

In a reactor tube according to the present invention the average outer surface to volume ratio (S/V) in the upstream end of the fixed bed is smaller than in the downstream end. The average outer surface to volume ratio (S/V) may vary over the fixed bed according to a gradient. It is also possible to have two or more layers with different average outer surface to volume ratio (S/V). For example, the fixed bed may comprise a layer with a lower average outer surface to volume ratio (S/V) at the upstream end, and one or more other layers with a higher average outer surface to volume ratio (S/V) at the downstream end.

In the present invention, 5% to 33% of the fixed bed volume at the upstream end, preferably in 7% to 25%, more preferably 7 to 18% of the fixed bed volume at the upstream end, shows a full-bed apparent catalytic activity per volume unit which is more than 70% lower, preferably 71% to 85% lower, more preferably 71% to 80% lower than the full-bed apparent catalytic activity per volume unit in the remaining fixed bed volume, and/or the weight of catalytically active metal per weight unit in 5% to 33% of the fixed bed volume at the upstream end, preferably in 7% to 25%, more preferably 7 to 18% of the fixed bed volume at the upstream end, is more than 70% lower, preferably 71% to 85% lower, more preferably 71% to 80% lower than the weight of catalytically active metal per weight unit in the remaining fixed bed volume.

In one embodiment, 25% to 50% of the fixed bed volume at the downstream end shows a higher full-bed apparent catalytic activity than the remaining fixed bed volume. More preferably, 5% to 40% of the fixed bed volume at the downstream end shows a full-bed apparent catalytic activity per volume unit which is 1.5 to 3 times higher than the full-bed apparent catalytic activity per volume unit in the remaining fixed bed volume.

In one embodiment, the weight of catalytically active metal per volume unit in 25% to 50% of the fixed bed volume at the downstream end is 1.5 to 3 times higher than the weight of catalytically active metal per volume unit in the remaining fixed bed volume. This may be achieved by filling 25% to 50% of the fixed bed volume at the downstream end with catalyst particles having a higher concentration of catalytically active metal than the catalyst particles in the remaining fixed bed volume.

In another embodiment, 25% to 50% of the fixed bed volume at the downstream end is filled with catalyst particles having a higher dispersion of catalytically active metal, and thus a higher surface area of catalytically active metal.

In one embodiment, the fixed bed of catalyst particles comprises three layers, each with a different full-bed apparent catalytic activity. The layer at the upstream end preferably takes 5% to 33% of the fixed bed volume and shows the least full-bed apparent catalytic activity of the three layers. The layer at the downstream end preferably takes 25% to 50% of the fixed bed volume sand shows the highest full-bed apparent catalytic activity of the three layers.

The invention further pertains to the use of a reactor tube according to the invention for performing a Fischer Tropsch reaction.

The invention further pertains to a Fischer Tropsch reaction in which a reactor tube according to the invention is used.

The invention further pertains to a process for carrying out a high-speed stop in a Fischer-Tropsch process which Fischer-Tropsch process comprises providing a feed to a fixed bed reactor comprising a Fischer-Tropsch catalyst, the reactor being at reaction temperature and pressure, and withdrawing an effluent from the reactor, characterized in that the high-speed stop is effected in a reactor tube according to the invention.

The high-speed stop may, for example, be effected by blocking the flow of feed to the reactor and depressurising the reactor via the bottom. The high-speed stop may, for example, be effected by blocking provision of $H_2$ to the reactor while providing CO to the reactor, and withdrawing gaseous reactor content from the reactor. The high-speed stop may, for example, be effected by blocking provision of feed to the reactor and simultaneously blocking the withdrawal of effluent from the reactor, and when the reactor has been blocked, the reactor preferably is cooled to a temperature between ambient and 200° C. The high-speed stop may, for example, be effected by blocking provision of CO and $H_2$ to the reactor, and withdrawing gaseous reactor content from the reactor, the gaseous reactor content being withdrawn at least in part from the inlet section of the reactor.

The invention further pertains to a process for carrying out a high-speed stop in a Fischer-Tropsch process which Fischer-Tropsch process comprises providing a feed to a fixed bed reactor comprising a Fischer-Tropsch catalyst, the reactor being at reaction temperature and pressure, and withdrawing an effluent from the reactor, said feed comprising gaseous components that are inert towards a Fischer-Tropsch reaction in an amount in the range of between 30 and 80 volume %, preferably between 35 and 80 volume %, characterized in that the high-speed stop is effected in a reactor tube according to the invention, and in which process the feed.

The reactor tube comprising a fixed bed of Fischer-Tropsch catalyst particles according to the present invention, and the process of the present invention, can be applied in a multi-reactor system. For example, multiple Fischer-Tropsch reactors can be used in a system, whereby at least one of the reactors comprises reactor tubes according to the present invention, and whereby to this/these reactor(s) a feed is provided that comprises gaseous components that are inert towards a Fischer-Tropsch reaction in an amount in the range of between 30 and 80 volume %, preferably between 35 and 80 volume %.

In a two-stage Fischer-Tropsch system, to one or more Fischer-Tropsch reactors in the first stage a feed may be provided that comprises gaseous components that are inert towards a Fischer-Tropsch reaction in an amount below 30 volume %, preferably below 25 volume %, for example in the range of between 10 and 30 volume %, preferably between 10 and 25 volume %. In the same two-stage Fischer-Tropsch system, to one or more Fischer-Tropsch reactors in the second stage a feed may be provided that comprises gaseous components that are inert towards a Fischer-Tropsch reaction in an amount in the range of between 30 and 80 volume %, preferably between 35 and 80 volume %, whereby this/these reactors in the second stage comprises reactor tubes according to the present invention.

A similar use of the present invention can be made for a Fischer-Tropsch system with three or more stages for which the present invention applies to all reactors in any stage to which a feed is provided that comprises gaseous components that are inert towards a Fischer-Tropsch reaction in an amount in the range of between 30 and 80 volume %, preferably between 35 and 80 volume %.

In a preferred embodiment the reactor tube has a ratio between length and diameter of at least 5, in particular at least 50. As an upper limit a ratio of at most 1000 may be mentioned.

In one embodiment, the reactor tube is a tube in a multitubular reactor, which comprises a plurality of reactor tubes at least partially surrounded by a heat transfer medium.

The tubes in a multitubular reactor generally have a diameter in the range of 0.5-20 cm, more in particular in the range of 1 to 15 cm. They generally have a length in the range of 3 to 30 m. The number of tubes in a multitubular reactor is not critical to the present invention and may vary in wide ranges, for example in the range of 4 to 50 000, more in particular in the range of 100 to 40 000.

Multitubular reactors and their use in Fischer-Tropsch processes are known in the art and require no further elucidation here.

The Fischer-Tropsch reaction is preferably carried out at a temperature in the range from 125 to 400° C., more preferably 175 to 300° C., most preferably 200 to 260° C. The pressure preferably ranges from 5 to 150 bar, more preferably from 20 to 80 bar. The gaseous hourly space velocity may vary within wide ranges and is typically in the range from 500 to 10000 Nl/l/h, preferably in the range from 1500 to 4000 Nl/l/h. The hydrogen to CO ratio of the feed as it is fed to the catalyst bed generally is in the range of 0.5:1 to 2:1.

Products of the Fischer-Tropsch synthesis may range from methane to heavy hydrocarbons. Preferably, the production of methane is minimised and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight. The CO conversion of the overall process is preferably at least 50%.

The products obtained via the process according to the invention can be processed through hydrocarbon conversion and separation processes known in the art to obtain specific hydrocarbon fractions. Suitable processes are for instance hydrocracking, hydroisomerisation, hydrogenation and catalytic dewaxing. Specific hydrocarbon fractions are for instance LPG, naphtha, detergent feedstock, solvents, drilling fluids, kerosene, gasoil, base oil and waxes.

Fisher-Tropsch catalysts are known in the art. They typically comprise a Group 8-10 metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or combinations thereof.

The optimum amount of catalytically active metal present on the carrier depends inter alia on the specific catalytically active metal. Typically, the amount of catalytically active metal present in the catalyst may range from 1 to 100 parts by weight per 100 parts by weight of carrier material, preferably from 3 to 50 parts by weight per 100 parts by weight of carrier material.

A most suitable catalyst comprises cobalt as the catalytically active metal and titania as carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements. Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

A most suitable catalyst comprises cobalt as the catalytically active metal and zirconium as a promoter. Another most suitable catalyst comprises cobalt as the catalytically active metal and manganese and/or vanadium as a promoter. If the catalyst comprises cobalt as the catalytically active metal and manganese and/or vanadium as promoter, the cobalt: (manganese+vanadium) atomic ratio is advantageously at least 12:1.

It will be understood that it is within the scope of the skilled person to determine and select the most appropriate conditions for a specific reactor configuration and reaction regime.

The present invention is illustrated by the following example, without being limited thereto or thereby.

EXAMPLES

Several examples have been performed with Fischer-Tropsch catalysts. Each set of experiments was performed using the same type of Fischer-Tropsch reactor tube, the same or very similar Fischer-Tropsch reaction conditions, and catalysts with similar length. All catalysts comprised titania as carrier, cobalt as catalytically active metal and manganese as promoter.

Example 1

Comparative Example

Catalyst particles were prepared comprising 20 wt % cobalt, calculated on the total weight of the catalyst particles. The shape of the catalyst particles was a trilobe shape with a 'cloverleaf' cross section as described in U.S. Pat. No. 3,857,780 and U.S. Pat. No. 3,966,644. The catalyst particles thus had a "TL" shape. The average outer surface to volume ratio (S/V) of these TL-shaped particles was 3.9. A reactor tube was filled with these catalyst particles.

Example 2

Comparative Example

Catalyst particles were prepared comprising 20 wt % cobalt, calculated on the total weight of the catalyst particles. The shape of the catalyst particles was a so-called "TA" shape, as described in WO2008087149. The average outer surface to volume ratio (S/V) of these TA-shaped particles was 4.8. A reactor tube was filled with these catalyst particles.

Example 3

Comparative Example

A reactor tube was filled with two types of catalyst. The catalyst particles that were first put in the reactor tube had a "TA" shape, as described in WO2008087149 and comprised 20 wt % cobalt, calculated on the total weight of those catalyst particles.

The catalyst particles that were put on top of that had a "TL" shape as described in U.S. Pat. No. 3,857,780 and U.S. Pat. No. 3,966,644 and comprised 10 wt % cobalt, calculated on the total weight of those catalyst particles.

The fixed bed in the reactor tube was a fixed bed according to WO2011080197. The top layer (TL, 10 wt % Co) took 17 volume % of the fixed bed volume. The average outer surface to volume ratio (S/V) of these TL-shaped particles was 3.9. The rest of the fixed bed volume contained the other particles (TA, 20 wt % Co). The average outer surface to volume ratio (S/V) of these TA-shaped particles was 4.8.

Example 4

According to Invention

A reactor tube was filled with two types of catalyst. The catalyst particles that were first put in the reactor tube had a "TA" shape, as described in WO2008087149 and comprised 20 wt % cobalt, calculated on the total weight of those catalyst particles.

The catalyst particles that were put on top of that had a "TL" shape as described in U.S. Pat. No. 3,857,780 and U.S. Pat. No. 3,966,644 and comprised 5 wt % cobalt, calculated on the total weight of those catalyst particles.

The fixed bed in the reactor tube was a fixed bed according to WO2011080197, and had the specific combination of features according to the present invention. The top layer (TL, 5 wt % Co) took 17 volume % of the fixed bed volume. The average outer surface to volume ratio (S/V) of these TL-shaped particles was 3.9. The rest of the fixed bed volume contained the other particles (TA, 20 wt % Co). The average outer surface to volume ratio (S/V) of these TA-shaped particles was 4.8.

Results for Examples 1 to 4

The reactor tubes were placed in a Fischer Tropsch reactor. Syngas was supplied and the Fischer-Tropsch reaction taking place was analyzed.

The $C_5+$ selectivity, the $CO_2$ selectivity, and the ability to withstand a high-speed stop (indicated as thermal stability) were determined. The results of these tests, for the reactor tubes as a whole, can be found in Tables 1 and 2. Example 1 shows the base case, and the other numbers given are relative to the base case. The fixed bed of Example 4 is a type of bed which is in accordance with the present invention.

The data in Table 1 concern experiments performed using syngas with a low inert level, namely 25 volume %. The data in Table 2 concern experiments performed using syngas with a high inert level, namely 57 volume %.

TABLE 1

| Experiment | Fixed bed | Inert level | $C_5+$ sel. | $CO_2$ sel. | Thermal stability |
|---|---|---|---|---|---|
| 1 (comp) | TL, 20 wt % Co | 25 vol % | Base case | Base case | Good |
| 2 (comp) | TA, 20 wt % Co | 25 vol % | 1.2% | −28% | Runaway |
| 3 (comp) | TL, 10 wt % Co<br>TA, 20 wt % Co | 25 vol % | +1.6 | −14 | Good |
| 4 (inv) | TL, 5 wt % Co<br>TA, 20 wt % Co | 25 vol % | 1.2% | −28% | Acceptable |

TL had S/V of 3.9
TA had S/V of 4.8

TABLE 2

| Experiment | Fixed bed | Inert level | $C_5+$ sel. | $CO_2$ sel. | Thermal stability |
|---|---|---|---|---|---|
| 1 (comp) | TL, 20 wt % Co | 57 vol % | Base case | Base case | Good |
| 2 (comp) | TA, 20 wt % Co | 57 vol % | 1.1% | −55% | Runaway |
| 3 (comp) | TL, 10 wt % Co<br>TA, 20 wt % Co | 57 vol % | +0.8% | −25% | Good |
| 4 (inv) | TL, 5 wt % Co<br>TA, 20 wt % Co | 57 vol % | 1.8% | −28% | Good |

TL had S/V of 3.9
TA had S/V of 4.8

The fixed bed of comparative Example 1 is well able to withstand a high-speed stop, but it shows a low $C_5+$ selectivity and a high $CO_2$ selectivity. This was the case when a syngas with a low level of inerts was used, and when a syngas with a high level of inerts was used.

The fixed bed of comparative Example 2 shows an improved $C_5+$ selectivity and an improved $CO_2$ selectivity, but is shows a high reduction in activity after a high-speed stop (indicated as "Runaway"). This was the case when a syngas with a low level of inerts was used, and when a syngas with a high level of inerts was used.

The fixed bed of comparative Example 3 is a type of bed which is well able to withstand a high-speed stop. Example 3 also shows an improved $C_5+$ selectivity and an improved $CO_2$ selectivity. This was the case when a syngas with a low level of inerts was used, and when a syngas with a high level of inerts was used.

The fixed bed of Example 4 is a type of bed which is well able to withstand a high-speed stop, and also shows an improved $C_5+$ selectivity and an improved $CO_2$ selectivity. This was the case when a syngas with a low level of inerts was used, and when a syngas with a high level of inerts was used.

As compared to Example 3, Example 4 proofed to have a better $C_5+$ selectivity when a syngas with a high level of inerts was used.

CONCLUSION

A Fischer-Tropsch fixed bed according to the present invention is especially suitable when the syngas that is used comprises gaseous components that are inert towards a Fischer-Tropsch reaction in an amount in the range of between 30 and 80 volume %, preferably between 35 and 80 volume %.

Application Examples

In a two-stage Fischer-Tropsch system, to one or more Fischer-Tropsch reactors in the first stage a feed may be provided that comprises gaseous components that are inert towards a Fischer-Tropsch reaction in an amount below 30 volume %, preferably below 25 volume %, for example in the range of between 10 and 30 volume %, preferably between 10 and 25 volume %, whereby this/these reactors in the first stage comprises reactor tubes according to or similar to Example 3. In the same two-stage Fischer-Tropsch system, to one or more Fischer-Tropsch reactors in the second stage a feed may be provided that comprises gaseous components that are inert towards a Fischer-Tropsch reaction in an amount in the range of between 30 and 80 volume %, preferably between 35 and 80 volume %, whereby this/these reactors in the second stage comprises reactor tubes according to or similar to Example 4.

A similar use of the present invention can be made for a Fischer-Tropsch system with three or more stages and reactors comprising reactor tubes according to or similar to Examples 3 and 4. For example to the first stage, or to the first and second stage, a feed may be provided with a low amount of inerts and the reactors in the first stage, or in the first and second stage, comprise reactor tubes according to or similar to Example 3. And to the second and further stage(s), or to the third and further stage(s), a feed may be provided with a high amount of inerts and the reactors in these stages comprise reactor tubes according to or similar to Example 4.

In case the fresh feed supplied to a multiple-stage system comprises gaseous components that are inert towards a Fischer-Tropsch reaction in an amount in the range of between 30 and 80 volume %, preferably between 35 and 80 volume %, the reactors in the first stage and in the further stage(s) preferably comprise reactor tubes according to or similar to Example 4.

What is claimed is:

1. A reactor tube comprising a fixed bed of Fischer-Tropsch catalyst particles, wherein the catalyst particles in 5% to 33% of the fixed bed volume at the upstream end have an average outer surface to volume ratio (S/V) in the range of between 3.0 to 4.5 $mm^{-1}$, and the catalyst particles in the remaining fixed bed volume have an average outer surface to volume ratio (S/V) in the range of between 4.5 to 8.0 $mm^{-1}$, and wherein the difference between the average S/V of the particles at the upstream end and the average S/V of the particles in the remaining fixed bed volume is at least 0.5 $mm^{-1}$, and wherein 5% to 33% of the fixed bed volume at the upstream end shows a full-bed apparent catalytic activity per volume unit which is more than 70% lower than the full-bed apparent catalytic activity per volume unit in the remaining fixed bed volume, and/or wherein the weight of catalytically active metal per weight unit in 5% to 33% of the fixed bed volume at the upstream end is more than 70% lower, than the weight of catalytically active metal per weight unit in the remaining fixed bed volume.

2. A reactor tube comprising a fixed bed of Fischer-Tropsch catalyst particles, wherein the catalyst particles in 7% to 25% of the fixed bed volume at the upstream end, have an average outer surface to volume ratio (S/V) in the range of between 3.0 to 4.5 mm', and the catalyst particles in the remaining fixed bed volume have an average outer surface to volume ratio (S/V) in the range of between 4.5 to 8.0 $mm^{-1}$ and wherein the difference between the average S/V of the particles at the upstream end and the average S/V of the particles in the remaining fixed bed volume is at least 0.5 $mm^{-1}$, and wherein 7% to 25% of the fixed bed volume at the upstream end, shows a full-bed apparent catalytic activity per volume unit which is more than 70% lower, than the full-bed apparent catalytic activity per volume unit in the remaining fixed bed volume, and/or wherein the weight of catalytically active metal per weight unit in 7% to 25% of the fixed bed volume at the upstream end, is more than 70% lower than the weight of catalytically active metal per weight unit in the remaining fixed bed volume.

3. A reactor tube comprising a fixed bed of Fischer-Tropsch catalyst particles, wherein the catalyst particles in 7 to 18% of the fixed bed volume at the upstream end, have an average outer surface to volume ratio (S/V) in the range of between 3.0 to 4.5 $mm^{-1}$ and the catalyst particles in the remaining fixed bed volume have an average outer surface to volume ratio (S/V) in the range of between 4.5 to 8.0 $mm^{-1}$, and wherein the difference between the average S/V of the particles at the upstream end and the average S/V of the particles in the remaining fixed bed volume is at least 0.5 $mm^{-1}$, and wherein 7 to 18% of the fixed bed volume at the upstream end, shows a full-bed apparent catalytic activity per volume unit which is more than 70% lower than the full-bed apparent catalytic activity per volume unit in the remaining fixed bed volume, and/or wherein the weight of catalytically active metal per weight unit in 7 to 18% of the fixed bed volume at the upstream end, is more than 70% lower than the weight of catalytically active metal per weight unit in the remaining fixed bed volume.

4. A reactor tube according to claim 1 wherein the particles in the remaining fixed bed volume have an effective diameter of at most 2 mm.

5. A reactor tube according to claim 1 wherein the surface area of the catalytically active metal in the upstream end of the fixed bed is lower than in the downstream end.

6. A reactor tube according to claim 1 wherein the full-bed apparent catalytic activity per volume unit in 25% to 50% of the fixed bed volume at the downstream end is 1.5 to 3 times higher than the full-bed apparent catalytic activity per volume unit in the remaining fixed bed volume.

7. A reactor tube according to claim 1 wherein the weight of catalytically active metal per volume unit in 25% to 50% of the fixed bed volume at the downstream end is 1.5 to 3 times higher than the weight of catalytically active metal per volume unit in the remaining fixed bed volume.

8. A reactor tube according to claim 1 wherein the catalyst particles at the upstream end, which have an average outer surface to volume ratio (S/V) in the range of between 3.0 to 4.5 $mm^{-1}$, are "TL" shaped catalyst particles, and the catalyst particles in the remaining fixed bed volume which have an average outer surface to volume ratio (S/V) in the range of between 4.5 to 8.0 $mm^{-1}$, are "TA" shaped catalyst particles.

* * * * *